SCALER READING DEVICE

Filed Aug. 29, 1966 3 Sheets-Sheet 1

INVENTOR
PIERRE QUIVY
BY William W. Stokes
ATTORNEY

April 7, 1970 P. QUIVY 3,505,503

SCALER READING DEVICE

Filed Aug. 29, 1966 3 Sheets-Sheet 2

INVENTOR
PIERRE QUIVY
BY William D. Stokes
ATTORNEY

April 7, 1970 P. QUIVY 3,505,503

SCALER READING DEVICE

Filed Aug. 29, 1966 3 Sheets-Sheet 3

INVENTOR
PIERRE QUIVY
BY William D. Stokes
ATTORNEY

United States Patent Office 3,505,503

Patented Apr. 7, 1970

3,505,503

SCALER READING DEVICE

Pierre Quivy, Grenoble, France, assignor to Commissariat a l'Energie Atomique, Paris, France, an organization of France Filed Aug. 29, 1966, Ser. No. 576,510
Claims priority, application France, Sept. 3, 1965, 30,342
Int. Cl. H03k *21/34, 21/10*
U.S. Cl. 235—92 8 Claims

ABSTRACT OF THE DISCLOSURE

A scaler having decades connected conventionally in cascade. To achieve economies and efficiencies in reading the output, individual trigger circuits are connected to respond to inputs to the decades. A selector circuit responds to the trigger circuits to indicate the high order decade which has been increased in value. Gates controlled by the selector circuit pass signals defining the content of that high order to a unidirectional coupler. A decoder connected to the selector generates signals defining the position of that high order.

This invention relates to the reading of scalers, that is, pulse counters comprising a plurality of elements for counting from 0 to $n$ in a closed cycle (generally consisting of decades in which $n=9$), connected in cascade for carry forward to the element of higher order, and outputs whereby the state of the counter elements can be displayed and/or stored, so that the contents of the scaler or counter can be read at a given moment; and it relates more particularly—since this would appear to be the most advantageous application—but not exclusively, to the reading of a number of pulses which vary amongst numerous orders (more particularly decimal orders) in scalers comprising a plurality of counter elements.

The object of the invention is more particularly to improve such reading in respect of practical requirements, inter alia as regards reading speed and reduction of the number of significant digits used to represent the order of magnitude of the scaler content at any given time.

According to a main feature, the invention consists in the following:

Firstly, a scaler comprising a plurality of counter elements, more particularly a plurality of decades, of successive orders, is read by reading both the order of the last counter element which has undergone a change of state and the state of the said last counter element and possibly that of at least one counter element of immediately preceding order;

Secondly, with regard to the device, the reading device for a scaler having $p$ counter elements each with $q$ outputs for the $q$ digits of the scaler code, more particularly $p$ decades with four outputs in the binary code "1–2–4–8," comprises in combination:

For each counter element: a bistable trigger circuit, the information input to this trigger circuit being connected in parallel to the input of the associated counter element to bring it from its first inoperative state to its second excited state whenever the said counter element undergoes a first change of state;

For the scaler generally: a selector having $p$ inputs each connected to a different trigger circuit to determine the state thereof in order to deduce therefrom the order of the last trigger circuit which has undergone a change of state and to feed a specific output representative of the said order from amongst its $p$ outputs;

For each counter element: a transmission gate having $n.q$ information inputs each connected to a different output of the associated counter element (and possibly of at least the counter element of immediately preceding order, $n$ being equal to the number of counter elements to which each gate is connected) and an opening control input connected to the output of the said selector corresponding to said associated counter element; and For the scaler generally: a conversion or decoding unit whose $p$ inputs are each connected to a different output of the said selector and whose outputs, more particularly the $q$ outputs, deliver a signal which in a code which is advantageously the same as that of the scaler represents the input fed by an output of the said selector, and hence the order of the last counter element which has undergone a change of state, a unidirectional couply having $n.q$ "OR" gates in parallel, each "OR" gate of which has $p$ inputs each connected to an output of all the transmission gates corresponding to one and the same digit of the code of the scaler for one and the same counter element connected to a transmission gate, said digit and possibly said counter element varying from one "OR" gate to the next, and the $n.q$ outputs of the coupler delivering a signal which in the scaler code represents the state of the last counter element which has undergone a change of state (and possibly of at least one counter element of preceding order), and means for restoring all the trigger circuits to the inoperative state together with all the counter elements between two successive counting operations.

Preferably, each trigger circuit comprises a first output which is fed when the trigger circuit is in the excited state and a second output which is fed when the trigger circuit is in the operative state, and the said selector consists of aparallel set of "AND" units, i.e., for each counter element, an "AND" unit with a first input connected to the first output of the trigger circuit associated with the same counter element, a second input connected to the second output of the trigger circuit associated with the counter element of the next order (with the exception of the last unit) and an output which is therefore fed only when the counter element associated with the trigger circuit is the last to have undergone a change of state.

Also, to allow reading if the reading time is longer than the mean interval between two successive pulses arriving in the scaler, the device may comprise a buffer store comprising two series of units in cascade, a transmission gate—storage elements, the information inputs to one of the transmission gates being each connected to a different output of the unidirectional coupler while the information inputs to the other transmission gate are each connected to a different output of the conversion unit, opening means adapted to apply an opening pulse at a given time to the opening input of the two transmission gates, means whereby the state of the storage elements of the two sets of units in cascade can be read after actuation of the said opening means, and buffer store erase means adapted to apply an erase pulse at a given time to the input for restoring the storage elements to the inoperative state.

Apart from this main feature, the invention covers a number of other features which are preferably used at the same time but which could, if necessary, be used separately, and which will be discussed in greater detail hereinafter.

The invention will be more readily understood from the following description given by way of example with reference to the appended drawings.

In the drawings:

FIGURE 1 diagrammatically illustrates a scaler comprising nine binary decades together with a reading device whereby both the order of the last decade which has undergone a change of state and the state of said decade can be read by application of the improvements according to the invention.

It should first be recalled that the scalers used in physics generally comprise of a plurality of decades with outputs which allow the state of the decades at a given time to be stored, for example in the binary code "1–2–4–8" on a punched or magnetic tape by means of a printing machine etc. Such scalers can be used in numerous applications.

While in some of these applications it is desirable to store the exact content of the scaler even if such storage requires a varying length of time, with some experiments the only important feature is the order of magnitude of the scaler content, it being unnecessary to read the last significant digits of the scaler content. Such reading may even become an obstacle if it entails excessive loss of time. This applies particularly to cases in which storage of the data is intended primarily for digital translation of physical analogue data which are known with a necessary limited accuracy. These values are translated by a small number of decimal digits, more particularly three decimal places, in cases where a 400-channel encoder is used. It will be apparent that if, for example, the contents of a scaler which at any given time can display a very large number, it is to be transferred to a 400-channel encoder, it is advantageous to use the three decimal places available to the best advantage.

The method according to the main feature of the invention relates precisely to such optimum utilisation.

The invention comprises reading a scaler having a plurality of counter elements, more particularly a plurality of decades, of successive orders, by reading both the order of the last counter element which has undergone a change of state and the state of the said last counter element and possibly that of at least one counter element of immediately preceding order (i.e. immediately lower order).

More particularly, where three decimal digits are used, only the order $c$ of the last counter element which has undergone a change of state, the state $a$ of said counter element, and the state $b$ of the counter element of immediately lower order are read. Thus the contents of the scaler are translated by a number having three digits, i.e. two significant digits and an exponent, the word "*abc*" then being interpreted as representing $(10a+b)\cdot 10^{c-1}$.

On the other hand, if only the state $a$ of the last counter element is read in addition to its order $c$, the contents of the scaler will be translated by a two-digit number, the word "*ac*" being interpreted as representing $a.10^{c}$.

This method can be performed by a device according to the invention which is intended for reading a counter scale comprising $p$ counter elements 11 (in cascade) each having $q$ outputs 12, more particularly (as illustrated) nine decades with four outputs in the binary code "1–2–4–8" and receiving a succession of pulses from its input 13.

Figure 1:
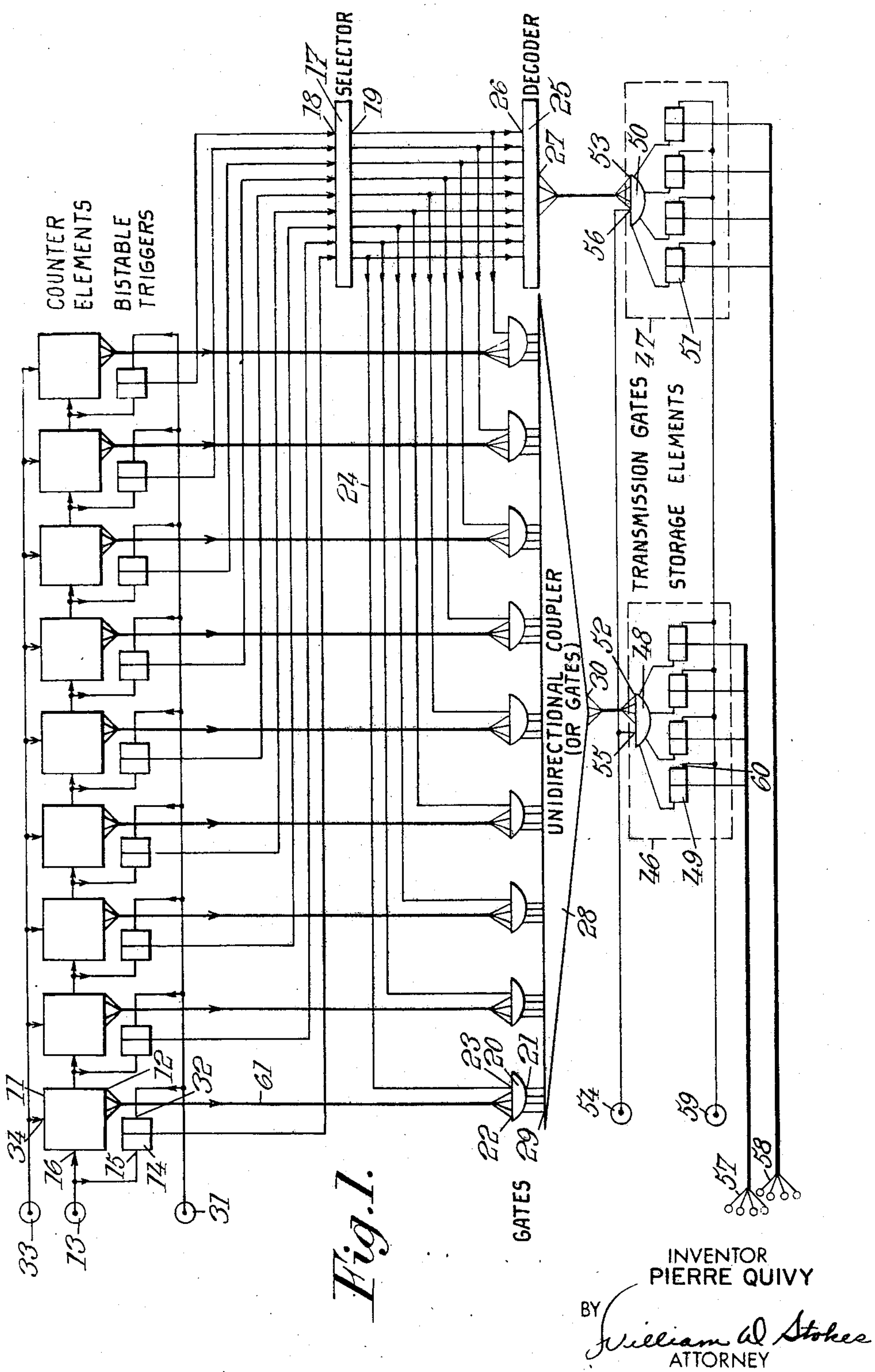

Referring to FIGURE 1, each counter element 11 of the device has associated therewith a bistable trigger circuit 14, the information input 15 to such trigger circuit being connected in parallel with the input 16 to the associated counter element 11 to bring it from its first inoperative state to its second excited state whenever the said counter element 11 undergoes a first change of state.

The device also comprises for the scaler generally a selector 17 having $p$ inputs 18 each connected to a different trigger circuit 14 in order to determine the state thereof, to deduce therefrom the order of the last trigger circuit 14 having undergone a change of state, and to feed a specific output representative of the said order from amongst the $p$ outputs 19.

Each counter element 11 of the device also includes a transmission gate 20 with *n.q.* outputs 21, *n.q.* information inputs 22 each connected to a different output 12 of the associated counter element 11 (and possibly of at least the counter element 11 of the immediately preceding order when reading the state of at least one counter element 11 of an order preceding the order of the last counter element which has undergone a change of state), $n$ being equal to the number of counter elements 11 to which each gate 20 is connected ($n=1$ in FIGURES 1 to 3 and $n=2$ in the case of FIGURE 4) and an opening control input 23 connected by a lead 24 to the output 19 of the said selector 17 corresponding to this associated counter element 11.

The device also includes for the scaler generally:

A conversion or decoding unit 25, of which the $p$ inputs 26 are each connected to a different output 19 of the selector 17, and of which the outputs 27—more particularly the $q$ outputs deliver a signal which by means of a code which is advantageously the same as that of the scaler represents the input 26 fed by an output 19 of the said selector 17, hence the order of the last counter element 11 which has undergone a change of state (for a binary display in accordance with the code "1–2–4–8" the conversion or decoding unit 25 comprises four outputs 27 like each counter element 11 and each transmission gate 20);

A unidirectional coupler 28 having *n.q.* "OR" gates (28*a*, 28*b*, 28*c*, 28*d*, FIGURE 3) in parallel, of which each "OR" gate has $p$ inputs 29 each connected to an output 21 of all the transmission gates 20 corresponding to one and the same digit of the code of the scale for one and the same counter element connected to a transmission gate 20, the said digit and possibly said counter element varying from one "OR" gate to the next and the *n.q.* outputs 30 of the coupler 28 delivering a signal which in the code of the scaler represents the state of the last counter element 11 which has undergone a change of state (and possibly of at least the counter element 11 of immediately preceding order);

And means for restoring all the trigegr circuits 14 to the inoperative state together with all the counter elements or decades 11 between two successive counting operations, said means connected at 31 and 33 consisting of a unit (not shown) of the manually or automatically operated type adapted to apply a rezeroing pulse at a given time to the rezeroing input 32 of each trigger circuit 14 and to the rezeroing input 34 of each decade 11 between two successive counting operations.

Figure 2:
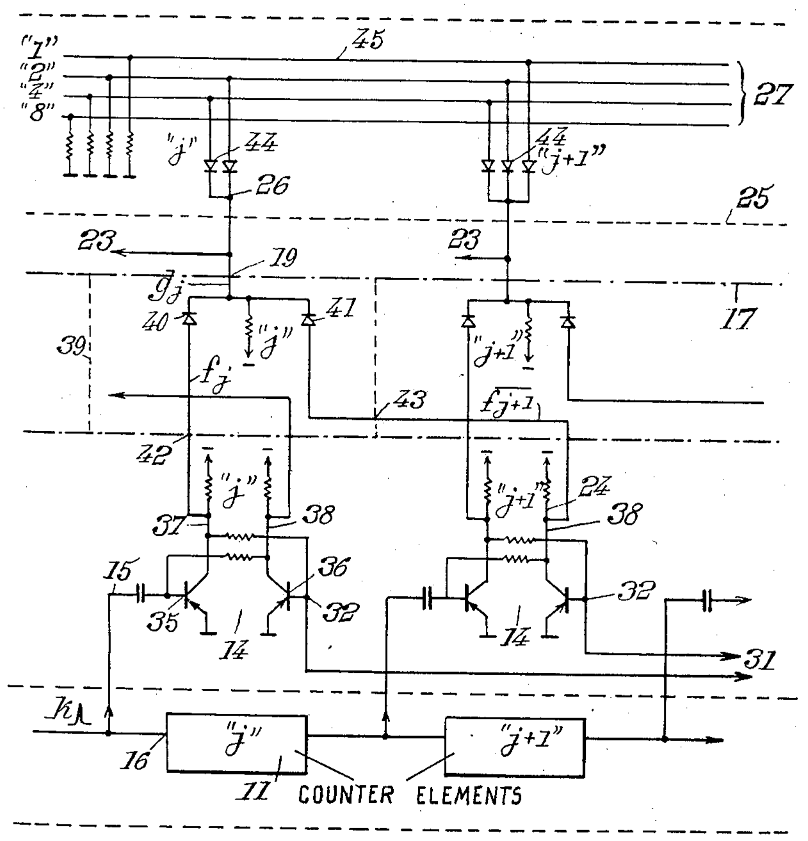
FIGURE 2 illustrates in greater detail a part of the diagram of FIGURE 1, i.e. two of the nine decades together with the associated trigger circuits, "AND" units and conversion elements.
Figure 3:
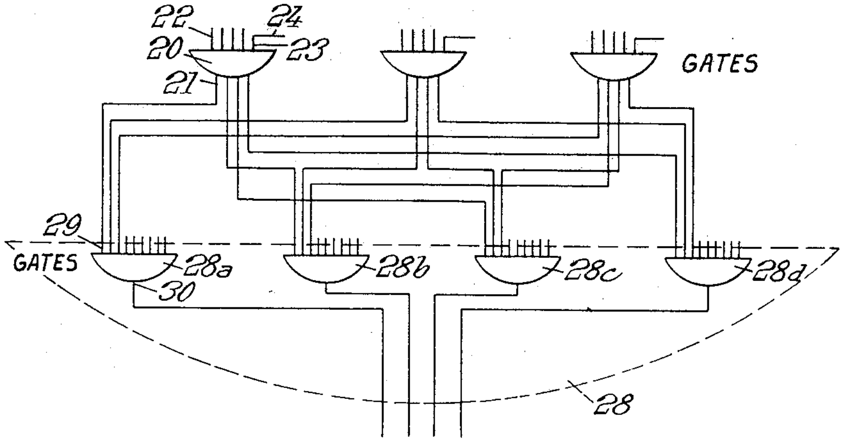
FIGURE 3 illustrates in greater detail another part of the circuit diagram shown in FIGURE 1, i.e. the unidirectional coupler with the associated "OR" units and transmission gates.

Referring to FIGURES 1 to 3, one embodiment will now be described in greater detail wherein the data is processed in decimal binary form in the code "1–2–4–8" ($q=4$), a single significant digit is read, and the exponent is not greater than 15 (it is in fact equal to 9), i.e., it can be represented in the code "1–2–4–8" by four digits as the state of each scaler.

Referring more particularly to FIGURE 2, it will be seen that the scaler then consists of a maximum of fifteen—in fact nine—decades (forming the counter elements 11) connected in cascade is the conventional way. Associated with each decade is a trigger circuit 14 consisting, for example, of two pnp transistors 35 and 36. Each trigger circuit 14 comprises a first output 37 which is fed when the trigger circuit is in the excited state (denoting the figure "1"), and a second output 38 which is fed when the trigger circuit is in the inoperative state (representing the figure "0"). Each trigger circuit 14 passes from the "0" to the state "1" whenever a first pulse $k$ occurs at the input 16 to the corresponding decade 11.

If the successive orders of the decades 11 and of the associated trigger circuits 14 are referred to as 1,2, . . . $j$, $j+1$, . . . $p$, and if reference $f_j$ denotes the state—in Boolean language—of the trigger circuit 14 of order $j$ ($f_j=0$ if the trigger circuit 14 of the order $j$ is in the state "0" and $f_j=1$ if the trigger circuit 14 of order $j$ is in the state "1"), the selector 17, which is of the matrix type, examines the states $f_j$ of all the trigger circuits 14 and its outputs $g_j$ ($g_j=0$ or 1) satisfy the Boolean operation $g_j=f_j \cdot \overline{f_{j+1}}$ (wherein $\overline{f_{j+1}}$ is the inverse of $f_{j+1}$, i.e., if $f_{j+1}=0$, then $\overline{f_{j+1}}=1$ and vice versa).

In other words, the selector 17 feeds only one of its outputs 19, i.e., that of the order $j$, so that $f_j$ is equal to "1" and $f_{j+1}$ is equal to "0" (i.e., $\overline{f_{j+1}}=1$). The order $j$ is then precisely that of the last trigger circuit 14 which has undergone a change of state, and hence of the last decade 11 (decade of highest order) which has received a pulse. Finally, the order $j$ represents the order of the (first) significant figure.

FIGURE 2 shows one embodiment of the units 17 and 25 in greater detail. The selector 17 consists of a parallel set of "AND" units 39, i.e., for each counter element or decade 11 (of order $j$), a unit having two diodes 40, 41 in parallel with a first input 42 connected to the first output 37 of the trigger circuit 14 (or order $j$) associated with the same counter element, a second input 43 connected to the second output 38 of the trigger circuit 14 (of order $j+1$) associated with the counter element of next order ($j+1$)—with the exception of the last "AND" unit—and an output 19 which is fed only when there are signals applied to the two inputs 42, 43 simultaneously, i.e. when the associated counter element (or order $j$) is the last to have undergone a change of state.

In fact, when a decade 11, for example that of the order $j$, has received a first pulse $k$, the trigger circuit 14 of the same order $j$ has also received this pulse $k$ and hence its output 37 receives a voltage step which is transmitted by the diode 40 of the selector 17 if the other diode 41 connected to the second output 38 of the trigger circuit 14 or order $j+1$ is also fed. As a result of this circuit arrangement, the "AND" unit 39 of order $j$ feeds its output if the trigger circuit 14 of order $j$ is in the state "1" (i.e. if the decade 11 of order $j$ has received at least one pulse) and if at the same time the trigger circuit 14 of the order $j+1$ is in the state "0," i.e., if the decade 11 of order $j+1$ has not received a pulse.

The output 19 of order $j$, which is fed, controls firstly the opening of the transmission gate 20 of the same order $j$ by the application—via the associated lead 24—of a voltage step to the opening input 23 of said gate 20 and secondly translation into the code "1–2–4–8" of this order $j$ by the conversion or decoding unit 25, the four outputs 27 of which transmit this order $j$ in the code "1–2–4–8."

To this end, one or more diodes 44 connect the output 19 of each "AND" unit 39 to one or more of the four leads 45 respectively denoting the figures 1,2,4,8 as indicated. More particularly, referring to FIGURE 2, the order $j$ is the order 6, the order $j+1$ being the order 7, because the output 19 or order $j$ is connected via two parallel diodes 44 to the two leads 45 respectively representing 2 and 4, while the output 19 of the order $j+1$ is connected via three parallel diodes 44 to the three leads 45 respectively representing 1, 2 and 4. The four outputs 27 of the decoder 25 thus give the order (in the code "1–2–4–8") of the last decade 11 having undergone a change of state, i.e. the order of the significant digit of the number of pulses reaching the scaler.

Referring to FIGURE 3, the construction of the unidirectional coupler or mixer 28 is shown in greater detail together with the associated transmission gates 20 for reading a single significant digit ($n=1$) in the code "1–2–4–8"

($q=4$). In this case, the four outputs 21 of each gate 20 are each connected to an input 29 of four "OR" gates 28$a$, 28$b$, 28$c$, 28$d$, the four of which constitute the coupler 28, each unitary "OR" gate 28$a$, 28$b$, 28$c$, 28$d$ having as many inputs 29 as there are gates 20 (nine inputs 29 in the embodiment shown by way of example). The gates 28$a$, 28$b$, 28$c$, 28$d$ transmit in the code "1–2–4–8" the digits of orders 1,2,4 and 8 of the gate 20, the opening input 23 of which has been fed from the selector 17 via lead 24 and thus the four outputs 30 give the four digits representing in the code "1–2–4–8" the significant digit to be displayed, i.e., the contents of the decade 11 of the highest order, (the one available at the outputs 27).

The order and the value of the first significant digit is thus finally available at the outputs 27 and 30, i.e., $a.c.$ which is read as $a.10^c$.

The above-described device allows reading at the outputs 30 and 27 only if the reading operation time is less than the mean counting cycle (mean interval between two successive pulses at the input 13 of the scaler) because otherwise the state of the scaler would not be constant during reading.

To allow reading even if the mean counting cycle is very short, for example of the order of $10^{-7}$ second, a buffer store (figure 1) is added to the reading device, said buffer store comprising two series 46, 47 of units in cascade, transmission gate 48—storage elements 49 for the first series and transmission gate—storage elements 51 for the second series, the information inputs 52 to gate 48 being each connected to a different output 30 of the unidirectional coupler 28 while the information inputs 53 to the transmission gate 50 are each connected to a different output 27 of the conversion unit 25. The storage elements 49 and 51 consist of two series of four trigger circuits for the eight digits of the value and order of the first significant digit of the scaler.

This buffer store is controlled by the folowing:

A storage control unit (connected at 54), consisting of opening means adapted to feed an opening pulse at a required time to the opening input 55, 56 of the two transmission gates 48 and 50.

Means whereby the state of the storage elements or trigger circuits 49, 51 available in the code "1–2–4–8" at the four outputs 57 and the four outputs 58 can be read after the actuation of the said opening means, and Erase means (connected at 59) to apply an erase pulse at a given time to the input 60 for restoring all the storage elements or trigger circuits 49, 51 to the inoperative state or "0."

The final reading is carried out at the outputs 57 and 58 respectively for the value of the first significant digit and for the order thereof between the application of an opening pulse from 54 and the application of an erase pulse from 59. Thus the state of the scaler can be read without any loss of storage when an opening signal is applied from 54.

Figure 4:
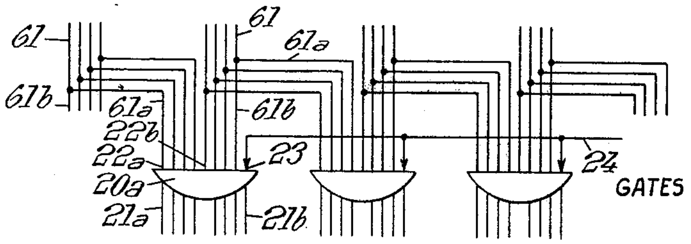
FIGURE 4 is a modification of the transmission gates disposed between the decades and the unidirectional coupler for reading not only the state of the last decade which has undergone a change of state but also the decade of an immediately preceding order.

In the variant shown in FIGURE 4, provision is made for the transmission of two significant digits ($a$ and $b$) and in this case the transmission gates 20$a$ (which replace the gates 20 in FIGURES 1 and 3) comprise eight information inputs 22$a$ and 22$b$ respectively connected to the outputs 12 of the decades 11 of the same order and immediately preceding order, the four leads 61 connected to the four outputs 12 of one decade 11 branching to leads 61$a$ and 61$b$ leading to two gates 20$a$ of consecutive orders. Feeding of opening input 23 to gate 20 by the associated lead 24 controls the transmission not of a single significant digit at four outputs 21 (as in the embodiment shown in FIGURES 1 and 3), but of two consecutive significant digits at eight outputs 21$a$ and 21$b$. In this case the coupler 28 and the unit 46 are modified to transmit and store eight digits instead of four.

It will readily be apparent that the invention can be extended to the reading of three (or more than three)

significant digits by the provision of three (or more than three) groups of four inputs for each gate 20, said groups being connected to the outputs of the decades 11 of the same order as that of the gate 20 and of the two preceding orders, and by consequently modifying the coupler 28 and the unit 46.

It will also be apparent that if accuracy is sacrificed the information content of a word consisting of a small number of digits (for example, 2, 3 or 4 digits) can be enormously increased.

For storage in plain form (for example on a typewriter), interpretation at sight is very simple. Thus "98" denotes $9.10^8$ in the case of reading just the first significant digit (FIGURES 1 to 3); on the other hand, in the case of a three-digit reading (two significant digits), the "word" 376 denotes $3.7\times10^6$ (modification of FIGURE 4).

In the case of storage on a punched or magnetic tape or on a punched card for automatic processing of the results, the exact algebraic form can be restored by a suitable programme.

Any of the embodiments will always yield a method and device for reading scalers, the operation of which is sufficiently clear from the foregoing for there to be no further need for explanation and the said method and device have numerous advantages, more particularly as folows, over prior art methods and devices of this type:

Reading is simple and fast.
A high information content is possible with a small number of digits.
The device can be embodied with simple and fast-operating elements.
The circuits, except perhaps for the first two or three trigger circuits 14 are of slow electronics type.

Of course, and as will be apparent from the foregoing, the invention is in no way limited to those applications and embodiments which have been more particularly discussed, but on the contrary it covers all variants thereof.

I claim:

1. A device for reading a scaler having an input terminal to which pulses to be recorded are applied, *p* counter elements each registering *q* digits, an input for each counter element and *q* outputs for each counter element for the *q* digits thereof such device comprising first means for reading the order of the highest order counter element which has undergone a change of state and second means for reading the state of such highest order counter element, said first means comprising: bistable means connected to the *p* inputs of the counter elements for transmitting signals indicative of any of the counter elements having undergone a change of state; selector means connected to said bistable means for deducing from the signals indicative of changes of state the order of the highest order counter element which has undergone a change of state; and converter means connected to said selector means for producing a coded first output signal indicative of the deduced highest order; and said second means comprising; gate means connected to the *q* outputs of each counter element for transmitting signals indicative of the states of the counter elements; open control means connected between said gate means and said selector means of said first means whereby the opening of said gate means is controlled to transmit a signal indicative of the highest order counter element which has undergone a change of state; and coupler means for receiving a signal from said gate means and for producing a coded second output signal representing the state of the highest order counter element which has undergone a change of state.

2. A device as claimed in claim 1, in which said gate means is adapted and controlled to transmit a further signal indicative of the state of at least one counter element of lower order immediately preceding the highest order counter element which has undergone a change of state; and said coupler means produces second coded output signals indicative of the state of said highest order element and each other counter element of lower order.

3. A device as claimed in claim 1, in which said converter means and said coupler means are adapted to produce first and second signals which are in the same code as that of the scaler.

4. A device as claimed in claim 1, including: a bistable unit associated with each counter element; an information input for each said bistable unit connected in parallel to the input of the associated counter element so that said bistable unit is brought from a first inoperative state to a second excited state whenever the associated counter element undergoes a first change of state; a selector; *p* selector inputs for the said selector, each such selector input being connected to a respective bistable unit to determine the state thereof in order to deduce therefrom the order of the highest order counter element which has undergone a change of state; *p* selector outputs to which said selector feeds a signal indicative of the deduced order of the highest order counter element which has undergone a change of state; a conversion unit; *p* conversion inputs for said conversion unit each connected to a different selector output; *q* conversion outputs at which the conversion unit delivers the coded first output signal, which signal indicates the conversion input fed by said selector, and thus the order of the highest order counter element; a transmission gate for each counter element; *q* transmission inputs for said transmission gate each connected to a respective output of the associated counter element; *q* transmission outputs for each said transmission gate; an opening control input for each transmission gate connected to one of the selector outputs of said selector corresponding to the counter element associated with the transmission gate; a unidirectional coupler; *q* "OR" gates in parallel in said unidirectional coupler; *p* gate inputs for each "OR" gate, each of which is connected to a transmission output of each of the transmission gates corresponding to one and the same digit of a counter element, such one digit being different for each "OR" gate; *q* coupler outputs at which the coupler delivers a signal which represents the state of the highest order counter element which has undergone a change of state; and rezeroing means for restoring all the bistable units to the inoperative state together with all the counter elements between two successive counting operations.

5. A device as claimed in claim 4 in which the state of at least one counter element of immediately preceding order to that of the highest order counter element which has undergone a change of state is read, such device being modified by the provision of: *n.q* transmission inputs for each transmission gate each connected to a different output of the associated counter element and to outputs of at least the counter element of immediately preceding order to said associated counter element, *n* being equal to the number of counter elements to which each gate is connected; *n.q* transmission outputs for each transmission gate; *n.q* "OR" gates in parallel in said unidirectional coupler; each of the *p* gate inputs for each gate being connected to a transmission output corresponding to one and the same digit for one and the same counter element connected to a transmission gate, the digit and the counter element varying from one "OR" gate to the next; and *n.q* coupler outputs at which said coupler delivers a signal which represents the state of the highest order counter element and the state of at least one counter element of immediately preceding order.

6. A device as claimed in claim 4 in which each bistable is a trigger circuit which comprises: a first output which is fed when the trigger circuit is in the excited state, and a second output which is fed when the trigger circuit is in the inoperative state; and the said selector comprises a parallel set of "AND" units including an "AND" unit for each counter element, a first input for each "AND" unit connected to the first output of the trigger circuit associated with the same counter element, a second input for each "AND" unit connected to the second output of the trigger circuit associated with the counter element of the next order, with the exception of the last unit, and an output for each "AND" unit which is therefore fed only when the counter element associated with the trigger circuit is the last to have undergone a change of state.

7. A device as claimed in claim 4 including a buffer store which allows reading of the scaler even if the reading time is greater than the mean interval between two successive pulses entering the scaler; said buffer store comprising: first and second store means for respectively storing the order of the highest order counter element to undergo a change of state and the state of said last counter.

8. A device as claimed in claim 7 in which said first store means comprises: a first transmission gate; information inputs for such first transmission gate being each connected to a different conversion output; and first storage elements fed by said first transmission gate; and said second store means comprises a second transmission gate; information inputs for such second transmission gate; and second storage elements fed by said second transmission gate; said buffer store further comprising: opening means adapted to apply an opening pulse at a given time to an opening input of the two transmission gates; means whereby the state of the first and second storage elements can be read after actuation of said opening means; and buffer store erase means adapted to apply an erase pulse at a given time to an erase input for restoring the storage elements to the inoperative state.

References Cited

UNITED STATES PATENTS

| | | | |
|---|---|---|---|
| 3,063,631 | 11/1962 | Ray | 235—92 |
| 3,086,708 | 4/1963 | Berkowitz et al. | 235—154 |

DARYL W. COOK, Primary Examiner

J. M. THESZ, Jr., Assistant Examiner

U.S. Cl. X.R.

328—50